US008341919B2

(12) United States Patent
Hardwick et al.

(10) Patent No.: US 8,341,919 B2
(45) Date of Patent: Jan. 1, 2013

(54) CORE COMPONENT AND DOOR COMPRISING THEREOF

(75) Inventors: Geoffrey B. Hardwick, St. Charles, IL (US); Henry M. Coghlan, St. Charles, IL (US); John Peter Walsh, St. Charles, IL (US); Allen Ray Hill, Laurel, MS (US)

(73) Assignee: Masonite Corporation, Tampa, FL (US)

( * ) Notice: Subject to any disclaimer, the term of this patent is extended or adjusted under 35 U.S.C. 154(b) by 0 days.

(21) Appl. No.: 13/210,585

(22) Filed: Aug. 16, 2011

(65) Prior Publication Data

US 2011/0296793 A1 Dec. 8, 2011

Related U.S. Application Data

(60) Continuation of application No. 12/755,670, filed on Apr. 7, 2010, now Pat. No. 7,998,382, which is a division of application No. 11/648,899, filed on Jan. 3, 2007, now Pat. No. 7,695,658.

(60) Provisional application No. 60/755,853, filed on Jan. 4, 2006.

(51) Int. Cl.
*E04C 2/34* (2006.01)
*B32B 5/14* (2006.01)

(52) U.S. Cl. ..................... 52/784.1; 52/784.15; 428/171

(58) Field of Classification Search ........................ None
See application file for complete search history.

(56) References Cited

U.S. PATENT DOCUMENTS

| | | | | |
|---|---|---|---|---|
| 5,887,402 | A * | 3/1999 | Ruggie et al. | 52/455 |
| 6,764,625 | B2 * | 7/2004 | Walsh et al. | 264/119 |
| 7,314,534 | B2 * | 1/2008 | Hardwick et al. | 156/245 |
| 2005/0016121 | A1 * | 1/2005 | Hardwick et al. | 52/749.1 |

* cited by examiner

*Primary Examiner* — Mary F Theisen
(74) *Attorney, Agent, or Firm* — Berenato & White, LLC

(57) ABSTRACT

The present invention is directed to a method of forming a molded core component. A mat formed from cellulosic fiber and resin is provided. The mat is consolidated in a first press until the resin is substantially fully cured, and then removed from the first press. The consolidated mat is then placed in a second press having a mold cavity shaped to form at least one depression in at least one of the major surfaces. The consolidated mat is reformed in the second press to form a molded core component having at least one depression in at least one of the major surfaces. The molded core component has a variable density, preferably of between about 10 lbs/ft$^3$ and 80 lbs/ft$^3$.

14 Claims, 5 Drawing Sheets

CORE COMPONENT AND DOOR COMPRISING THEREOF

CROSS-REFERENCE TO RELATED APPLICATION AND CLAIM TO PRIORITY

This application is a continuation of application Ser. No. 12/755,670, filed Apr. 7, 2010, now U.S. Pat. No. 7,998,382, which is a divisional of application Ser. No. 11/648,899, filed Jan. 3, 2007, now U.S. Pat. No. 7,695,658, which is based on provisional application Ser. No. 60/755,853, filed Jan. 4, 2006, the disclosures of which are incorporated herein by reference and to which priority is claimed.

FIELD OF THE INVENTION

The present invention is directed to a method of forming a molded core component. A mat formed from cellulosic fiber and resin is provided. The mat is consolidated in a first press until the resin is substantially fully cured, and then removed from the first press. The consolidated mat is then placed in a second press having a mold cavity shaped to form at least one depression in at least one of the major surfaces. The consolidated mat is reformed in the second press to form a molded core component having at least one depression in at least one of the major surfaces. The molded core component has a variable density, preferably of between about 10 lbs/ft$^3$ and 80 lbs/ft$^3$.

BACKGROUND OF THE INVENTION

Doors having compression molded door facings are well known in the art. Typically, a perimeter frame is provided, which includes first and second styles and first and second rails attached together to form a rectangular frame. A lock block may also be utilized to provide further support for a door handle and/or a locking mechanism at the periphery of the door. The lock block is preferably secured to a stile and/or a rail. Door facings are adhesively secured to opposite sides of the frame.

The resulting door includes a void or hollow space defined by the opposing door facings and perimeter frame. This void typically causes the door to be lighter than a comparably sized solid, natural wood door, which is not as desirable for many consumers. In addition, the sound and/or heat insulation provided by such doors may not be satisfactory. Therefore, it is often desirable to use a core material (e.g., core pieces or components) to fill the hollow space.

A suitable core material should provide the door with a desirable weight, for example the weight of a similarly-styled natural solid wood door. In addition, a core material should provide the door with a relatively even weight distribution. The core material should also be configured to match the dimensions of the interior space defined by the facings and frame with sufficiently close tolerances so that optimal structural integrity and insulation properties are achieved.

Door facings may be molded from a planar cellulosic mat to include one or more interior depressions or contours, such as one or more square or rectangular depressions which extend into the hollow space of a door assembly relative to the plane of an outermost exteriorly disposed surface of the door. For example, a door facing may include molded walls having a plurality of contours that include varied curved and planar surfaces that simulate a paneled door.

If the door facings are contoured to include one or more depressions, the interior void of the door assembly will have varying dimensions given the facings are secured to co-planar stiles and rails. When providing a core material or component within the void of a door assembly having such contoured facings, it is necessary to compensate for the varying dimensions of the void.

In the past, core materials made of corrugated cardboard and/or paper have been used. However, it has been found that the sound insulation provided by doors using cardboard core materials is not satisfactory for many applications. U.S. Pat. No. 5,887,402 to Ruggie et al., the disclosure of which is incorporated herein by reference and which is owned by the same assignee of the present application, discloses a contoured core components made from wood fibers which overcomes many of the problems associated with conventional cardboard core materials. The '402 patent discloses forming a planar core component and then post-press machining or routing the major surfaces of a component to accommodate for the depressions formed in the door facings of the door assembly. However, this process is relatively expensive given the manufacturing time and equipment required. In addition, the process of machining or routing core components often results in plant dusting problems. As such, this process is not overly efficient and the resulting door product is relatively expensive.

U.S. Pat. No. 6,764,625 to Walsh et al., the disclosure of which is also incorporated herein by reference and which is owned by the same assignee of the present application, discloses an improvement over the method and component disclosed in the '402 patent. In accordance with the '625 patent, fiber/resin mat is molded in a conventional press to include depressions corresponding to the configuration of the depressions in the door facings. When removed from the press, the core component of the '625 patent is placed in the void of the door assembly without the need for machining, routing or other post-press surface pressing.

Although the '625 patent solves many of problems associated with the prior methods, the press cycle required for molding the core components is relatively long given the resin in the mat must be sufficiently cured in order to maintain structural integrity when the core is removed from the press. We have found that the structural integrity of the core component is better in depressed portions of the core component due to the reduction in caliper in such portions. A reduction in caliper results in an increase in density, which increases structural integrity. The perimeter of a core component to be used for a typical contoured door assembly does not include densified portions at the perimeter of the component given the depressed portions are spaced from the periphery of the door. In order to provide a core component having sufficient structural integrity when removed from the press, core components formed in accordance with the '625 patent typically include a densified perimeter. This densified perimeter is trimmed after the molding process so that the core has the desired configuration. The trimmed material is then discarded. This trimming requirement, as well as the wasted trim material, increases manufacturing costs and the cost of the resulting door.

Therefore, there is a need for a method of forming a core component that solves some or all of the above-noted problems.

SUMMARY OF THE INVENTION

The present invention is directed to a method of forming a core component. A mat formed from cellulosic fiber and resin is provided. The mat is consolidated in a first press using heat and pressure until the resin is substantially fully cured. The consolidated mat is removed from the first press. The consolidated mat is then placed in a second press having a mold cavity shaped to form at least one depression in at least one of the major surfaces of the consolidated mat. The consolidated mat is reformed in the second press using heat and pressure to form a molded core component having at least one depression in at least one of the major surfaces. The molded core component has a variable density, preferably of between about 10 lbs/ft$^3$ and 80 lbs/ft$^3$.

The disclosed invention also relates to a method of forming a door using the disclosed molded core component. A rectangular frame having opposed sides is provided. First and second door facings are provided. Each of the door facings has a major planar surface, and at least one of the door facings has contoured portions extending inwardly relative to the corresponding major planar surface. The first door facing is secured to one of the sides of the frame. The disclosed molded core component is positioned against an interior surface of the first door facing. The second door facing is secured to the other side of the frame to form a door.

DETAILED DESCRIPTION OF THE INVENTION

Figure 1:
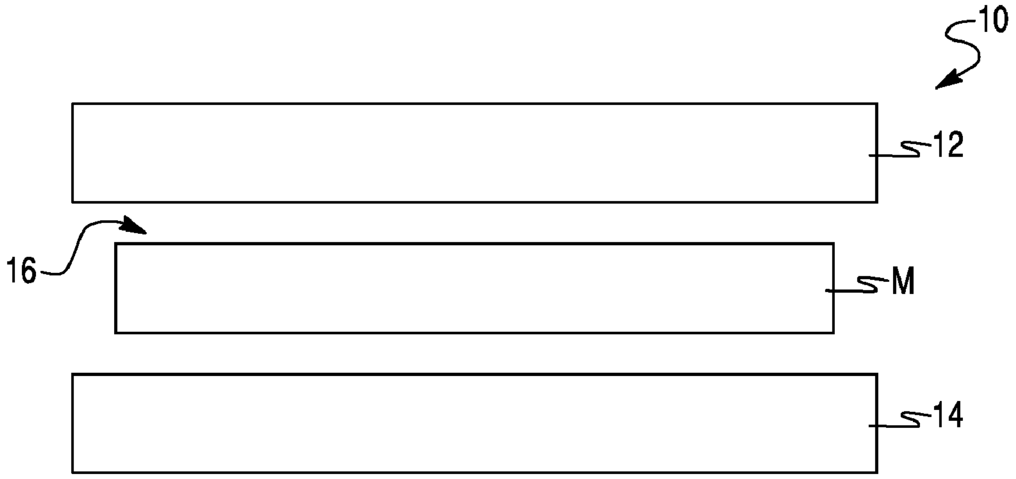
FIG. 1 is a cross-sectional view of a first press and mat according to the present invention.

The present invention is directed to a method of forming a molded core component. As best shown in FIG. 1, a mat M formed from cellulosic material and a binder resin is provided. The resin is preferably a thermosetting resin, such as urea-formaldehyde resin, phenol-formaldehyde resin, or melamine-formaldehyde resin. Methylene di-p-phenylene isocyanate (MDI) resin may also be used. Various fibrous materials may be used including agricultural fibers such as straw fibers, e.g. wheat straw fibers, and/or other cellulosic materials such as cellulosic fibers, cellulosic particles, wood flakes, or wood flour. A first press 10 is provided having an upper mold 12 and a lower mold 14, which form a mold cavity 16. Preferably, at least one of molds 12, 14 is configured for injecting steam into mold cavity 16, and may include conduits through which the steam is injected. However, conventional heated platen pressing may also used.

Mat M is disposed in mold cavity 16 between upper and lower die molds 12, 14, and consolidated using heat and pressure. According to a preferred embodiment, steam is injected into mold cavity 16 during compression, and thus into mat M. The injected steam flows into, through, and then out of mat M, as described in U.S. Pat. No. 5,756,599 to Teodorczyk, the disclosure of which is incorporated herein by reference. The heat transferred by the steam causes the binder resin in mat M to cure as mat M is being consolidated. The pressure within mold cavity 16 during consolidation of mat M may vary depending on press size, the density of mat M, the temperature within mold cavity 16, and the temperature of the steam. Preferably, the temperature within mold cavity 16 is between about 300° F. and about 400° F. during consolidation, more preferably between about 320° F. and about 360° F. if a urea-formaldehyde resin is used. However, it should be understood that pressing temperature may vary depending on various factors, including the thickness of mat M, the type of cellulosic material being pressed, the moisture content of the cellulosic material, the press time, and the type of resin which is utilized. For example, the preferred temperature of mold cavity 16 may be greater than 400° F. if a phenol-formaldehyde resin is used. Preferably, press time is relatively short, preferably in a range of between about 30 seconds and about 60 seconds.

Figure 2:
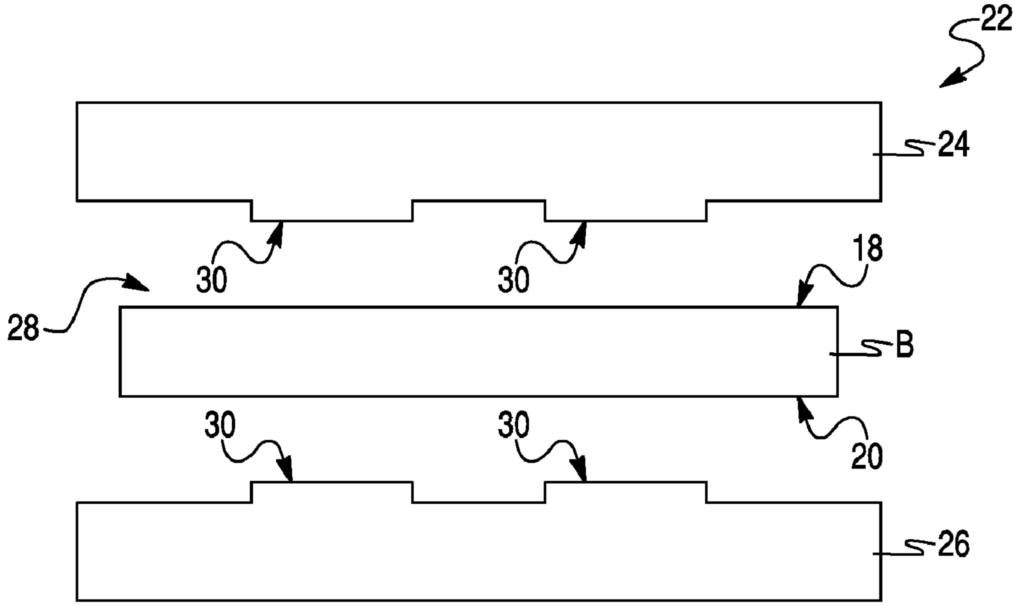
FIG. 2 is a cross-sectional view of a second press and consolidated board according to the present invention.

Mat M is consolidated in first press 10 until the resin is substantially fully cured to form a board B, as best shown in FIG. 2. Board B preferably has opposed substantially planar major surfaces 18, 20. Board B also preferably has a substantially uniform density of between about 12 lbs/ft$^3$ and 16 lbs/ft$^3$. Depending on press parameters and materials used to form mat M, first press 10 may form any type of consolidated wood composite board, including softboard, medium density hardboard, chipboard, and oriented strandboard.

The resin in mat M is substantially fully cured after the pressing process in first press 10. If steam injection is employed, the resulting board B is relatively strong compared to a similarly configured mat that is compressed without steam injection. As such, a lower density board may be formed, such as softboard, and still provide sufficient structural integrity when removed from first press 10.

Figure 3:
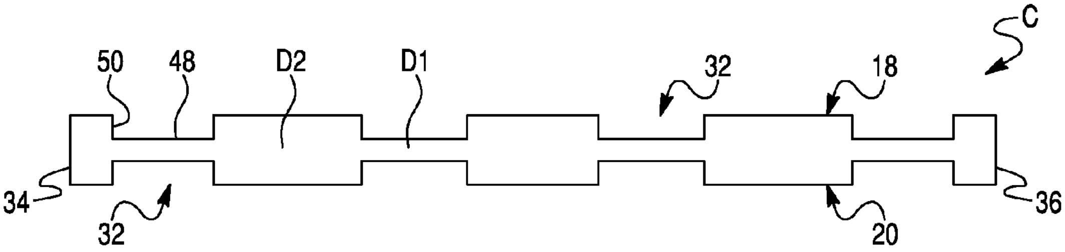
FIG. 3 is a cross-sectional view of a core component according to an embodiment of the present invention.

A second press 22 is provided having an upper mold 24 and a lower mold 26, which form a mold cavity 28. Board B is removed from first press 10, and disposed within mold cavity 28 of second press 22. Molds 24 and 26 include one or more protrusions 30, which form a corresponding depression(s) 32 in major surface(s) 18 and/or 20 of board B during compression, as best shown in FIGS. 2 and 3. Board B is reformed in second press 22 using heat and pressure to form a molded core component C having at least one depression 32 in at least one of the major surfaces 18, 20. Board B may be reformed by elevating the temperature sufficiently to soften the resins, thereby permitting protrusions 30 to compress the board B as pressure is applied to the platens to which molds 24 and 26 are affixed.

Core component C preferably has a variable density of between about 10 lbs/ft$^3$ and 80 lbs/ft$^3$, more preferably between about 11 lbs/ft$^3$ and 75 lbs/ft$^3$. Core component C preferably has a specific gravity of between about 0.17 and about 1.20. Protrusions 30 are pressed into board B, thereby reforming board B to include densified portions corresponding to depressions 32. However, portions of board B that are not engaged by protrusions 30 are only slightly compressed, and thus the density of such portions is only slightly increased during the reforming process in second press 22.

The density of the material disposed between depression 32 of major surface 18 and depression 32 of major surface 20, indicated as D1 on FIG. 3, is preferably compressed to have a density of between about 60 lbs/ft$^3$ and 80 lbs/ft$^3$. However, the density of the material adjacent depressions 32, indicated as D2, preferably has a density of between about 10 lbs/ft$^3$ and 30 lbs/ft$^3$. As shown in FIG. 3, the caliper of core component C in densified portions D1 is less than the caliper of adjacent portions D2. Thus, the variable caliper provides for portions having a relatively high density (D1), which provide core component C with excellent structural integral. However, the lower density areas (D2) reduce the amount of material needed to form core component C. It should be understood that the range of density variations of core component C may vary depending on the initial density and caliper of board B after steam injection pressing.

During compression in second press 22, peripheral portions 34, 36 of board B do not crack or delaminate because the resin in board B is substantially fully cured during compression in first press 10. As noted above, a reduction in caliper results in an increase in density, which increases structural integrity. However, the perimeter of a core component used for many contoured door assemblies does not include densified portions at the perimeter of the component given the depressed portions are spaced from the periphery of the door. The method disclosed in the '625 patent requires that the core component be molded to include a densified peripheral portion in order to provide that core component with sufficient structural integrity to allow removal from the press and resist delamination. The densified perimeter of the core component formed by the method disclosed in the '625 patent is thereafter trimmed and discarded as waste.

In the present invention, there is no need to provide a densified peripheral portion because the resin is fully cured, preferably by steam injection, in first press 10 prior to reformation in second press 22. The structural integrity of the peripheral portions of board B is sufficient to withstand the reformation process in second press 22 without delaminating. By first steam-injecting the substrate, and then post-forming the substrate into a molded core component, the potential for delamination is virtually eliminated. As such, die molds used to form the core components do not have to include a perimeter for increasing density of the substrate. Thus, the core component C of the present invention may be more efficiently manufactured, with less material waste compared to prior methods.

Pressure and press temperature of second press 22 may vary depending on the press and materials utilized. Preferably, the temperature within mold cavity 28 is between about 300° F. and about 400° F. during reformation, more preferably between about 360° F. and about 400° F. if a urea-formaldehyde resin is used to form mat M. However, it should be understood that pressing temperature may vary depending on various factors, including the thickness of board B, the type of material being pressed, the moisture content of board B, the press time, and the type of resin which is utilized, as noted above. Press time in second press 22 is preferably in a range of between about 30 seconds and about 60 seconds.

Reformation press time is relatively short because mat M has already been consolidated in first press 10. For example, a comparable core component formed using conventional pressing techniques typically requires a press cycle time almost twice as long as the cycle time required in the present invention (assuming other material, temperature and pressure parameters are constant).

Prior to reforming board B in second press 22, major surfaces 18, 20 may be moisturized using a water/release agent solution after removing board B from first press 10. For example, surfaces 18, 20 may be exposed to a water/release agent spray or bath prior to disposing board B within cavity 28 of second press 22. Preferably, board B has a moisture content of between about 0% and about 4% prior to reformation in second press 22. Moisturizing board B helps to soften the fibers during reformation, thereby minimizing the possibility of cracking during compression in second press 22.

Major surfaces 18, 20 may also be sanded after removing board B from first press 10, particularly if mat M is subjected to steam injection by first press 10. The conduits through which the steam is injected in first press 10 may leave raised impressions on the surface of board B. It may be desirable to sand these raised impressions off in order to ensure proper reformation in second press 22.

Figure 4:
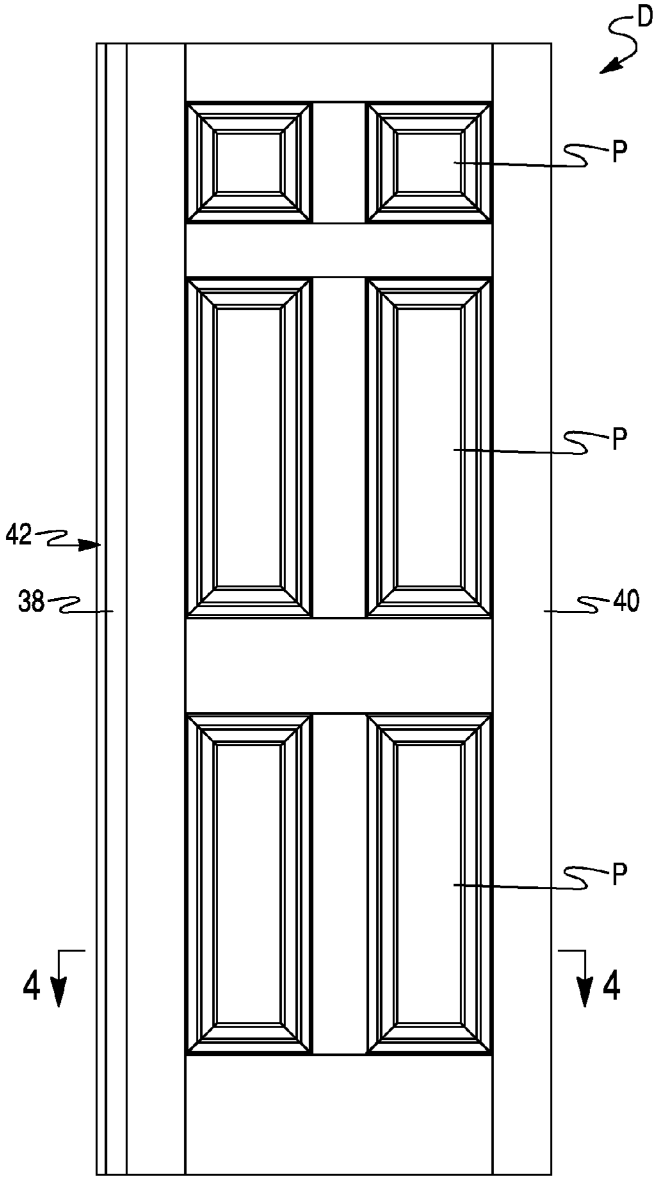
FIG. 4 is a perspective view of a six-panel door according to the present invention.
Figure 5:
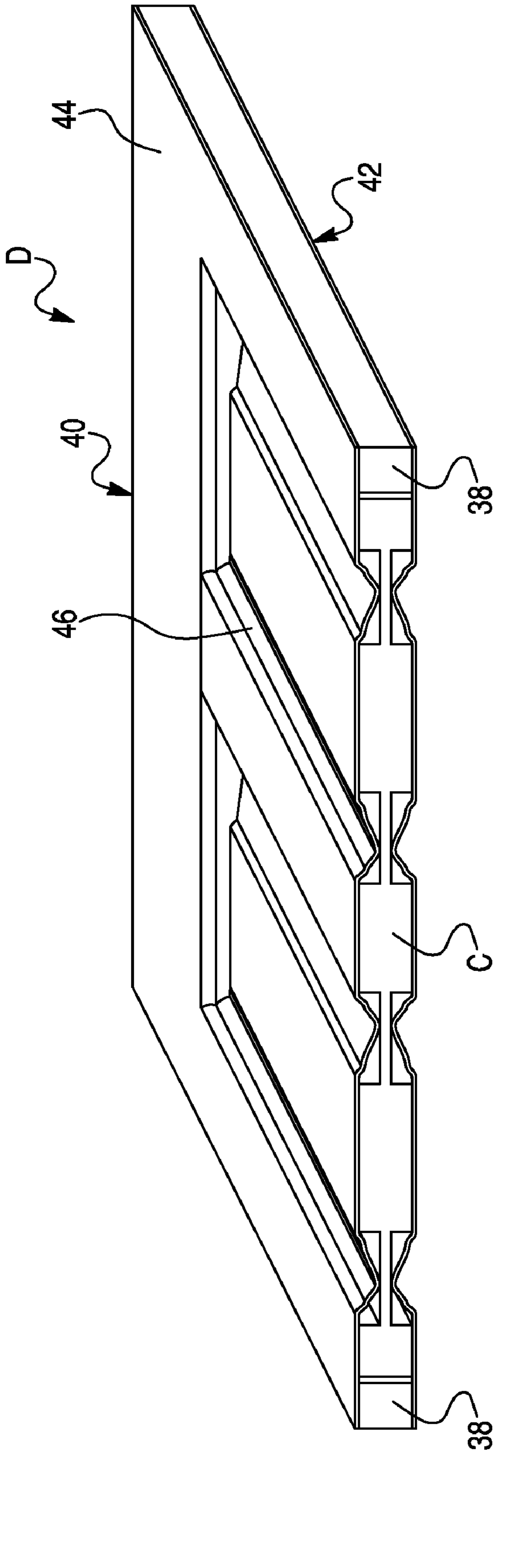
FIG. 5 is a cross-sectional perspective view of the door of FIG. 4 taken along line 4-4 and viewed in the direction of the arrows.

Preferably, depressions 32 are formed in both of major surfaces 18, 20, as best shown in FIG. 3. Major surface 18 is also preferably a mirror image of major surface 20. The number of depressions 32 may vary depending on the configuration of the door in which core component C is to be used. For example, core component C may be configured for use with a door D having a plurality of panel portions P, as best shown in FIG. 4. Door D includes a perimeter frame 38, first and second door facings 40, 42, and a core component C, as best shown in FIG. 5. Door facings 40, 42 are adhesively secured to opposite sides of frame 38, forming a cavity or void therebetween. Each door facing 40, 42 includes a major planar surface 44, and a plurality of contoured portions 46 recessed from major planar surface 44 and extending into the void formed between facings 40, 42. Core component C includes a plurality of depressions 32, as described above, which are configured to receive contoured portions 46.

Figure 6:
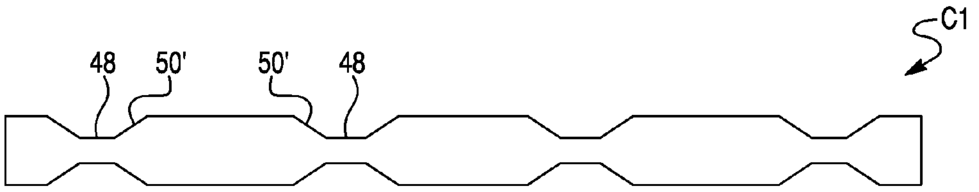
FIG. 6 is a cross-sectional view of a core component according to another embodiment.
Figure 7:
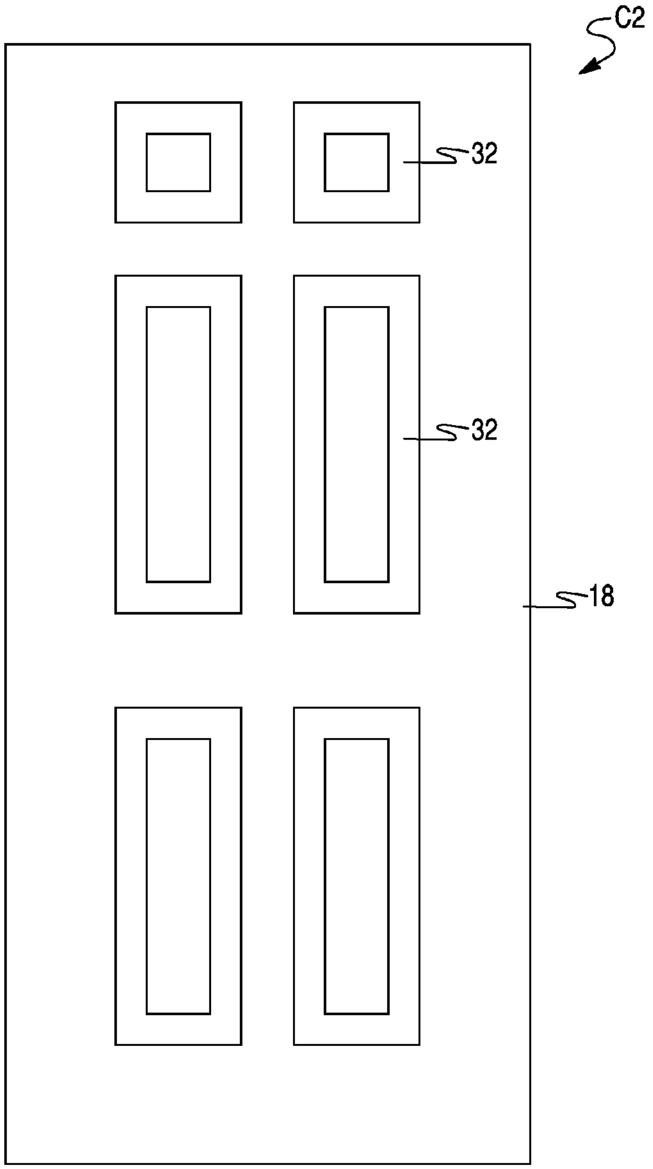
FIG. 7 is an elevational view of a core component configured for use with a six-panel door.

As best shown in FIG. 3, each depression 32 includes a bottom surface 48 and sidewalls 50. Sidewalls 50 may be substantially perpendicular to bottom surface 48. Alternatively, a core component C1 may be provided having sidewalls 50' angularly disposed relative to bottom surface 48, as best shown in FIG. 6. The specific configuration of depressions 32 may vary depending on the configuration of contoured portions 46. However, depressions 32 should provide a chamber or recess into which contoured portions 46 may extend. In addition, the configuration of depressions 32 may vary depending on the number of panels P provided on door D. An exemplary configuration of core component C2 is shown in FIG. 7. Core component C2 is configured for use with a six-panel door, and includes a plurality of depressions 32 extending into major surface 18.

Figure 8:
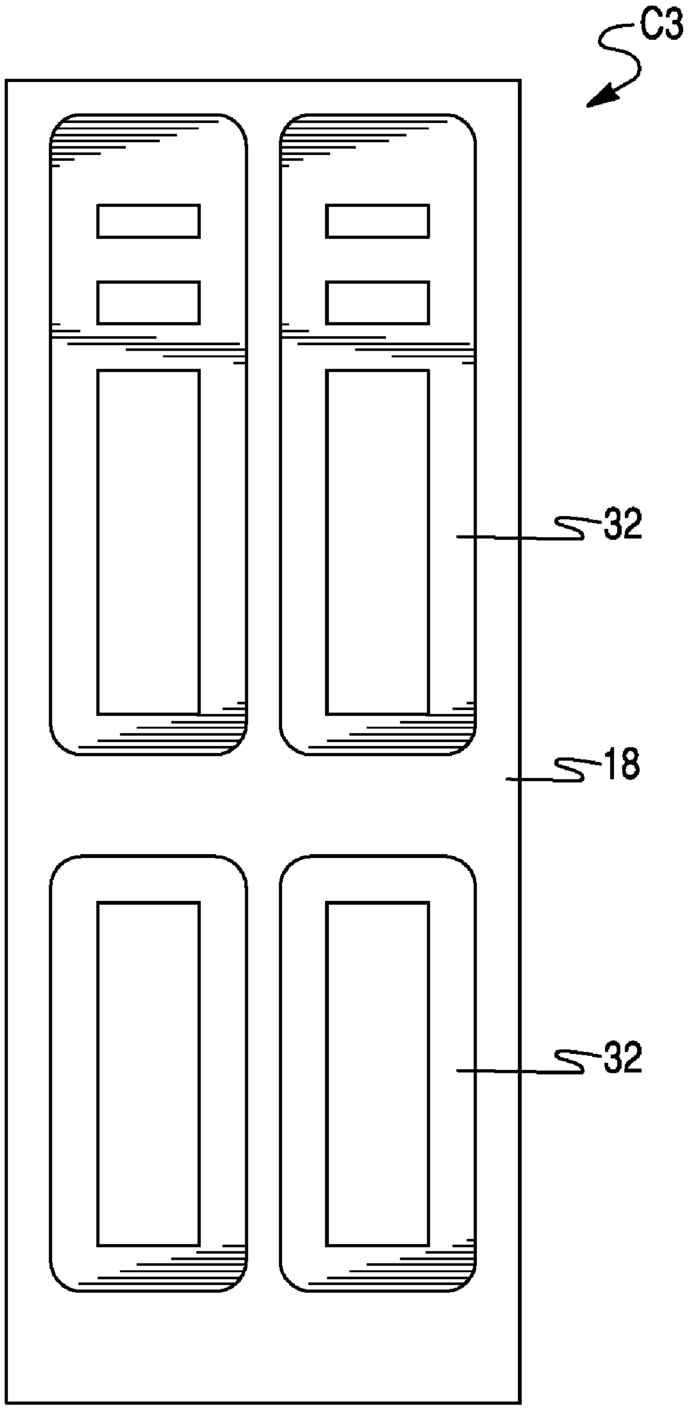
FIG. 8 is an elevational view of a core component according to another embodiment, wherein the core component may be utilized with multiple styles of paneled door facings.

A core component C3 according to another embodiment is shown in FIG. 8, and includes depressions 32 extending into major surface 18. Core component C3 may be used with multiple styles of door facings. One skilled in the art would understand that the specific configuration of depressions may vary depending on the particular style of the door facing with which it may be used.

When assembling door D, an adhesive layer may be applied to the interiorly disposed surface of first facing 40, such as by roll coating, spraying, or some other suitable means. Frame 38 is then aligned with the perimeter of first facing 40, and secured thereto. Molded core component C is then aligned with and secured to the interiorly disposed surface of first facing 40, so that molded component C is disposed within frame 38. An adhesive layer is then applied to the exposed surface of molded core component C and frame 38. Second facing 42 is then aligned with frame 38 and core component C, and secured thereto.

It will be apparent to one of ordinary skill in the art that various modifications and variations can be made in construction or configuration of the present invention without departing from the scope or spirit of the invention. Thus, it is intended that the present invention cover all such modifications and variations, and as may be applied to the central features set forth above, provided they come within the scope of the following claims and their equivalents.

We claim:

1. A variable-density, molded core component reformed from a pre-consolidated mat, the variable-density core component comprising substantially fully-cured cellulosic material and resin and having opposed major surfaces;

at least one of the major surfaces of the variable-density core component having at least one depression having a density between about 60 lbs/ft$^3$ and 80 lbs/ft$^3$.

2. The variable-density core component of claim 1, wherein areas adjacent the at least one depression have a density between about 10 lbs/ft$^3$ and 30 lbs/ft$^3$.

3. The variable-density core component of claim 1, wherein the opposed major surfaces are mirror images of each other.

4. The variable-density core component of claim 1, wherein the at least one depression is defined by a bottom surface and sidewalls.

5. The variable-density core component of claim 4, wherein the sidewalls are substantially perpendicular to the bottom surface.

6. The variable-density core component of claim 4, wherein the sidewalls are angularly disposed relative to the bottom surface.

7. A door comprising:

a frame having a first side and a second side;

a first door facing secured to the first side of the frame;

a second door facing secured to the second side of the frame; and a variable-density, molded core component reformed from a pre-consolidated mat, the variable-density core component comprising substantially fully-cured cellulosic material and resin and having opposed major surfaces;

at least one of the major surfaces of the variable-density, molded core component having at least one depression having a density between about 60 lbs/ft$^3$ and 80 lbs/ft$^3$;

the variable-density, molded core component being disposed between the first door skin and the second door skin.

8. The door of claim 7, wherein areas adjacent the depression of the variable density molded core component have a density between about 10 lbs/ft$^3$ and 30 lbs/ft$^3$.

9. The door of claim 7, wherein the at least one depression comprises first and second depressions respectively in the major surfaces of the variable-density, molded core component.

10. The door of claim 7, wherein the opposed major surfaces of the variable density molded core component are mirror images of each other.

11. The door of claim 7, wherein the depression of the variable-density molded core component is defined by a bottom surface and sidewalls.

12. The door of claim 11, wherein the sidewalls of the variable-density molded core component are substantially perpendicular to the bottom surface.

13. The door of claim 11, wherein the sidewalls of the variable-density molded core component are angularly disposed relative to the bottom surface.

14. A door comprising:

a frame having a first side and a second side;

a first door facing having a major planar surface and an inwardly extending contoured portion secured to the first side of the frame;

a second door facing secured to the second side of the frame; and a variable-density, molded core component reformed from a pre-consolidated mat, the variable-density core component comprising substantially fully-cured cellulosic material and resin and having opposed major surfaces;

at least one of the major surfaces of the variable density, molded core component having at least one depression having a density between about 60 lbs/ft$^3$ and 80 lbs/ft$^3$;

the variable-density, molded core component being disposed between the first door skin and the second door skin so that the inwardly extending contoured portion of the door facing being received by the depression in the core component.

* * * * *